United States Patent
Huisinga et al.

(10) Patent No.: US 9,717,259 B2
(45) Date of Patent: *Aug. 1, 2017

(54) METHOD OF PRODUCING CELLULOSE ENCASED SAUSAGES

(75) Inventors: Benjamin P. Huisinga, Haverhill, IA (US); Jos J. Kobussen, Indianola, IA (US); Robert W. Damstetter, Ankeny, IA (US); Adrianus Josephes Van De Nieuwelaar, Gemert (NL); Marcus Bernard Hubert Bontjer, Aarle Rixtel (NL)

(73) Assignee: MAREL MEAT PROCESSING INC., Des Moines, IA (US)

( * ) Notice: Subject to any disclaimer, the term of this patent is extended or adjusted under 35 U.S.C. 154(b) by 918 days.

This patent is subject to a terminal disclaimer.

(21) Appl. No.: 12/911,361

(22) Filed: Oct. 25, 2010

(65) Prior Publication Data

US 2011/0097462 A1 Apr. 28, 2011

Related U.S. Application Data

(63) Continuation-in-part of application No. 12/713,380, filed on Feb. 26, 2010.

(60) Provisional application No. 61/254,784, filed on Oct. 26, 2009.

(51) Int. Cl.
*A23L 13/60* (2016.01)
*A23P 20/20* (2016.01)
*A22C 11/00* (2006.01)
*A23B 4/005* (2006.01)
(Continued)

(52) U.S. Cl.
CPC .......... *A23B 4/0056* (2013.01); *A22C 11/003* (2013.01); *A23B 4/044* (2013.01); *A23L 13/65* (2016.08); *A23P 30/25* (2016.08)

(58) Field of Classification Search
CPC .......... A23L 13/65; A23P 20/20; A23P 30/25; A22C 11/003; A23B 4/0056; A23B 4/044
USPC ....... 426/389, 412, 105, 138, 140, 129, 135, 426/410, 415; 428/34.8; 452/50, 21, 22, 452/30, 35
See application file for complete search history.

(56) References Cited

U.S. PATENT DOCUMENTS 1,631,723 A * 6/1927 Freund .......................... 426/315
2,136,106 A * 11/1938 Kern .............................. 426/105
2,137,903 A * 11/1938 Walter .......................... 426/665
(Continued)

FOREIGN PATENT DOCUMENTS

GB 1187635 4/1970
GB 2176990 1/1987
(Continued)

OTHER PUBLICATIONS

"Cooked Italian Sausage" Sep. 23, 2008 http://web.archive.org/web/20080923043117/http://www.italian-cooking-made-easy.com/cooking-italian-sausage.html.*
(Continued)

*Primary Examiner* — Viren Thakur
(74) *Attorney, Agent, or Firm* — Zarley Law Firm, P.L.C.

(57) ABSTRACT

The invention relates to a method for producing preformed peeled packed sausages, comprising the steps of subsequently: A) heating an encased sausage; B) peeling a casing from the sausage at higher surface temperatures; and C) packing the peeled sausage. The invention also relates to a production device for producing preformed peeled packed sausages with such a method.

15 Claims, 1 Drawing Sheet

(51) Int. Cl.
*A23B 4/044* (2006.01)
*A23P 30/25* (2016.01)

(56) References Cited

U.S. PATENT DOCUMENTS

| | | | | |
|---|---|---|---|---|
| 2,301,564 | A | * | 11/1942 | Menges .................... 426/135 |
| 2,630,598 | A | * | 3/1953 | Grey ......................... 452/50 |
| 2,685,518 | A | | 8/1954 | Prohaska |
| 2,839,780 | A | * | 6/1958 | Demarest et al. .............. 452/50 |
| 3,113,870 | A | * | 12/1963 | Barnett et al. ................ 426/315 |
| 3,204,844 | A | * | 9/1965 | Wallace ..................... 226/104 |
| 3,235,388 | A | * | 2/1966 | Francis ..................... 426/245 |
| 3,268,948 | A | * | 8/1966 | Swift ......................... 99/353 |
| 3,390,422 | A | * | 7/1968 | Doyle ........................ 452/50 |
| 3,503,756 | A | * | 3/1970 | Wistreich .................... 426/276 |
| 3,589,915 | A | * | 6/1971 | Lustig ........................ 426/105 |
| 3,853,999 | A | * | 12/1974 | Kentor ....................... 426/105 |
| 3,903,313 | A | * | 9/1975 | Maher et al. ................. 426/250 |
| 4,138,767 | A | * | 2/1979 | Stiles ........................ 452/50 |
| 4,171,381 | A | * | 10/1979 | Chiu ......................... 426/105 |
| 4,222,150 | A | * | 9/1980 | Andersen .................... 452/50 |
| 4,263,329 | A | * | 4/1981 | Olson et al. ................. 426/310 |
| 4,371,554 | A | * | 2/1983 | Becker ...................... 426/243 |
| 4,997,663 | A | * | 3/1991 | Potthast ..................... 426/241 |
| 5,021,252 | A | * | 6/1991 | Huang et al. ................ 426/412 |
| 5,053,239 | A | * | 10/1991 | Vanhatalo et al. ............ 426/412 |
| 5,094,649 | A | | 3/1992 | Hall et al. |
| 5,246,395 | A | | 9/1993 | Zirps et al. |
| 5,551,334 | A | | 9/1996 | Cody |
| 5,914,141 | A | | 6/1999 | Stall et al. |
| 6,989,170 | B2 | * | 1/2006 | Konanayakam et al. .... 426/243 |

FOREIGN PATENT DOCUMENTS

| | | |
|---|---|---|
| GB | 2248010 A | 3/1992 |
| NL | 1014685 | 7/2001 |
| WO | 2007032678 A1 | 3/2007 |

OTHER PUBLICATIONS

Pearson, A.M., "Processed Meats" Third Edition, 1996, pp. 96-101.*
"Cooking Most Smoked Meats" Nov. 1994.*
FAO ("Small-scale sausage production"). Aug. 10, 2007 http://web.archive.org/web/20070810023635/http://www.fao.org/docrep/003/x6556e/X6556E07.htm.*
Definition of "intermittent" Retrieved Feb. 11, 2015.*
Masana et al: "Foot-and-mouth disease virus inactivation in beef frankfurters using a biphasic cooking system", Food Microbiology, Academic Press Ltd, London, GB, vol. 12, Feb. 1, 1995, pp. 373-380, XP005078916, ISSN:0740-0020, DOI: DOI: 10.1016/S0740-0020(95)80118-9 p. 374, right-hand column—p. 375, left-hand column; tables 1,2.
Pearson A.M. and Tauber F.W. : "Processed meats", 1985, AVI, Westport, XP002628378, pp. 192-201, the whole document.

* cited by examiner

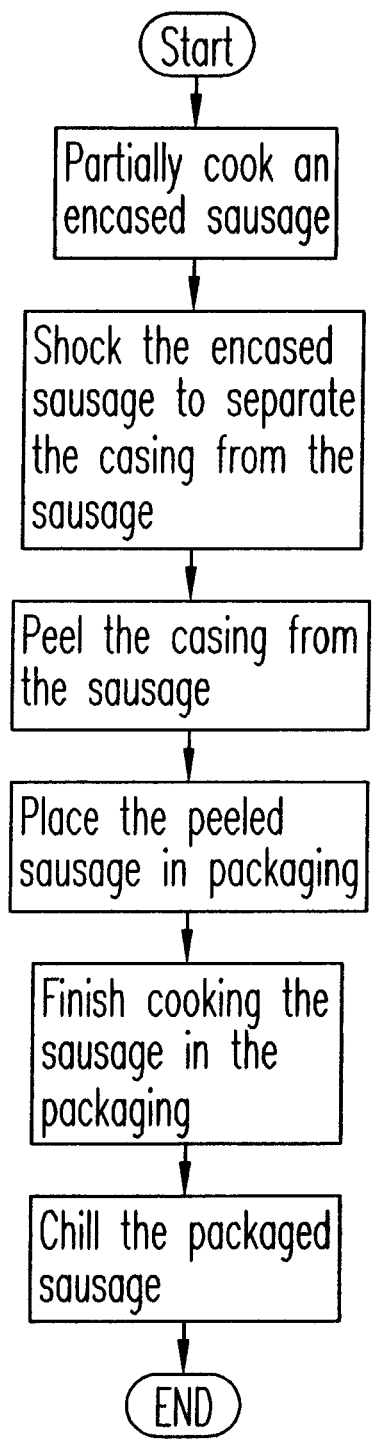

METHOD OF PRODUCING CELLULOSE ENCASED SAUSAGES

CROSS REFERENCE TO RELATED APPLICATION

This application is a continuation-in-part of U.S. Ser. No. 12/713,380 filed Feb. 26, 2010 which is a continuation of U.S. Ser. No. 61/254,784 filed Oct. 26, 2009.

BACKGROUND OF THE INVENTION

This invention is directed toward a method of producing cellulose encased preformed, peeled and pack sausages, and more particularly a method of producing food safe and/or peeled and pack encased sausages.

Presently, during production, preformed sausages are provided with a cellulose, collagen, alginate (or a combination) casing that is (at least partially) removed before the sausages are packed. The casing provides, during production, a temporary peelable cover that controls the shape of the dough.

In addition, preformed sausages may be provided during the production process with a cellulose-casing that is (at least partly) removed before the sausages are packed. The casing to be removed enables the production of sausages with controlled shape from dough that is not to be shaped as desired without the temporary peelable cover.

After production of the covered sausage the sausages are initially heated such that the sausages are fully cooked. The sausages are then actively cooled down to temperatures below 4° C. for thermo shocking the sausage such that the casing loosens. Shocking occurs by exposing the encased sausages to an environment having a different temperature such as for example using cold water or cold air. Steam may also be used to shock the sausage. Once shocked the encased sausages may be introduced to a peeler where the casing is removed from the sausages. The peeled sausages may afterwards be auto loaded using a loader into a packaging machine and packed to enable transport, storage and/or preservation of the sausage. The package may vary, and well known types of packages are foil, jars, tins, packs and so on.

The preformed peeled and packed sausages are exposed to the environment after heating (to effect the sausage hardening) and peeling but before packaging. Such sausages are potentially exposed to pathogen contaminants such as *Listeria* or *Salmonella*. When consumed, pathogen infected food products can cause serious illness or even death. Present production methods attempt to minimize this risk by post packaging treatments such as high pressure pasteurization, post heat pasteurization and irradiation. While these treatments produce a food-safe product, they also degrade the quality of the product, are complex to use and/or are costly.

Therefore, a need exists in the art for a method that produces safe preformed peeled and packed sausages, while maintaining a high quality product reducing production costs, and being easy to perform.

An objective of the present invention is to provide an efficient method of producing safe preformed peeled and packed sausages that maintains high product quality.

Another objective of the present invention is to provide an effective method of producing preformed peeled and packed sausages that reduces production costs and energy consumption.

A still further objective of this invention is to provide a method of producing preformed peeled and packed sausages where the method is easy to perform.

In an additional embodiment a method for producing preformed peeled packed sausages, comprising the steps of subsequently: A) heating an encased sausage; B) peeling a casing from the sausage at a sausage surface temperature of at least 20° C.; and C) packing the peeled sausage. The heating of the encased sausage during step A) results in the at least partial hardening of the sausage dough (e.g. meat, fish and/or organic dough) due to e.g. the at least partial coagulation of proteins enhancing the rigidity of the sausage to withstand any further production process steps. The sausage is peeled when the sausage minimum surface temperature during peeling is at or above 20° C., even to or at least 30° C., at least 40° C. or at least 50° C. Alternatively, other minimum surface temperatures for the sausages during peeling may be applied; e.g. minimum of 25° C., 35° C., 45° C. or 55° C.

The advantage of keeping the sausage temperature at a higher level during the "hot peeling" is that less energy is required for cooling down the sausage between the heating during step A) and the peeling during step B). The less cooling also requires less cooling time (thus limiting the total production process time of preformed peeled packed sausages) and less cooling (equipment) capacity. Shortening processing time and limiting the (cooling) capacity of the equipment required both contribute in enhancing the efficiency of the production of preformed peeled packed sausages. The process is faster, simpler, easier to perform, energy saving and less costly particularly as compared to irradiation and high pressure processing. The method also increases capacity, improves yield, eliminates the need for anti-microbial additives, improves shelf life, eliminates microbial contamination and is compliant with HACCP standards.

These and other objectives will be apparent to one skilled in the art based upon the following disclosure.

SUMMARY OF THE INVENTION

A method of producing preformed peeled, encased and pack sausages including partially cooking an encased sausage, hot peeling the encased sausage, and finishing the cooking of the sausage inside the final packaging. The critical control points such as the high temperature for lethality and the low chill temperature are monitored and controlled by a controller.

BRIEF DESCRIPTION OF THE DRAWING

FIG. 1 is a flow diagram of a method of producing cellulose encased sausages.

DETAILED DESCRIPTION OF THE PREFERRED EMBODIMENTS

Generally, the method involves the development of a cooking process where the casing of the sausage is hot peeled in an undercooked state and then fully cooking and chilling the product within the packaging.

Initially, through a conventional process, a casing is filled, linked, hung, and transported to an oven. Next, the encased sausages are heated (or partially cooked) to preferably an internal temperature of between 125° F. to 145° F. so that enough of the sausage proteins are coagulated to make the sausages sufficiently rigid to withstand the remaining production process. The cooking time for this step is based upon the oven temperature and the diameter and composition of the sausage. Preferably, in one example, the sausages are exposed to a natural smoke or liquid smoke shower and then exposed to a first cooking zone having a 140° F. dry bulb and a 100° F. wet bulb for a desired period of time. Optionally, the sausages are then exposed to a second natural smoke or liquid smoke shower before entering a second cooking zone. The second cooking zone preferably has a 158° F. dry bulb and a 130° F. wet bulb.

Once the sausages reach a desired internal temperature, the encased sausage is shocked so that the casing is loosened from the sausages. Shocking occurs by exposing the encased sausages to an environment having a different temperature such as for example using hot water, cold water, or steam.

Once shocked, the encased sausages are introduced to a peeler where the casing is removed from the undercooked sausages. This is different from the conventional process where an encased sausage is fully cooked prior to peeling. The process of undercooking, shocking and peeling is defined as hot peeling. Preferably, hot peeling occurs when the encased sausages are peeled at a temperature where the sausages are in an undercooked state, but not chilled (approximately between 100° F. and 140° F.). Once peeled the sausages are auto loaded using a loader into a packaging machine and vacuum packed.

After the sausages have been vacuum packed, the packages are cooked to lethality preferably in hot water. The cooking can be continuous or intermittent. Intermittent cooking is particularly beneficial for double stacked products to avoid over cooking of the outside of the product. Once the packaged sausages are cooked, the products are chilled, preferably in cold water to 40° F. or less.

Throughout the production process the cooking and chilling temperatures are electronically monitored by a controller. This monitoring insures that critical control points (i.e., high temperature lethality and low chill temperature) are always met. Also, this monitoring allows feedback for automatic adjustments to the system can be made.

This method provides several benefits. First, the process eliminates microbial contamination. Second, the quality of the product is not compromised as, for example, it is not recooked through post pasteurization as the cooking of the sausages are completed in the packaging. Third, the process is much more simple, easy to perform, and less costly particularly as compared to irradiation and high pressure processing. The method also increases capacity, improves yield, eliminates the need for anti-microbial additives, improved shelf life, improved compliance with HACCP standards, and uses less energy.

The encased sausage is advantageously heated during step A) to such an extent that it is not fully coagulated (also referred to as "partially cooked"), or in other words to such an extent that only a part of the sausage proteins are set but the sausage surface is stable enough to enable the peeling of the sausage. To make sure that the sausage surface is adequately stable the sausages are heated to a surface temperature of at least 50° C. As there are no restrictions towards a minimum temperature to which the internal temperature of the sausages have to be raised it has advantages, both in relation to food-safety and stability, to raise the internal temperature of the sausages to a temperature of between 50° C. to 65° C. The heating time for this step is based upon the oven temperature and the diameter and composition of the sausage. The thermal processing (at least partial cooking, hardening) enables the subsequent removal (peeling) of the external casing.

The casing peeled from the sausage may comprise a cellulose, an alginate and/or a collagen. As such casings are easy to apply, e.g. using coextrusion technique. As cellulose, alginate and collagen are all temperature sensitive ingredients there is a preference for the skilled person to cool the casing down to a low temperature (e.g. below 4° C.) before peeling the casing from the sausage, as both the effects of thermo shocking and hardening will facilitate easy peeling. However the method provides the inventive understanding that also peeling at higher sausage surface temperatures (at or above 20° C.) provides unexpected advantages for cellulose, alginate and collagen peelable casings.

After packing the peeled sausage according step C) the peeled packed sausage may be heated in the packaging to a surface temperature of at least 72° C. Heating the peeled packed sausage to a surface temperature of at least 72° C. ensures that any pathogen contaminants are eliminated. When the peeled sausage according step is heated in the packaging to even a core temperature of at least 72° C. the cooking process is finished after packing ("cook in pack") which may be applied when the sausage is hot peeled in an undercooked state, being the not fully coagulation of the sausage during processing step A), thus to be fully cooked within the packaging. The heating can be continuous or intermittent, intermittent heating is particularly beneficial for double stacked products to avoid over heating of the outside of the sausages. Subsequently the packed sausages may also be chilled within the packaging to limit degrading of the sausage quality, e.g. in cold water to 5° C. or less.

An additional process step may be the smoking of the peeled sausages before they are packed. The smoking can be realized with natural smoke and/or liquid smoke. In one example, the sausages are exposed to a natural smoke or liquid smoke shower and then exposed to a first cooking zone having a 60° C. dry bulb and a 38° C. wet bulb for a desired period of time. Optionally the sausages are then exposed to a second natural smoke or liquid smoke shower before entering a second cooking zone. The second cooking zone preferably has a 70° C. dry bulb and a 55° C. wet bulb.

An alternative additional processing step is to actively cool the encased sausages between steps A) and B). As elucidated before the peeling during step B) according to the present invention takes place at an enhanced temperature, however such enhanced temperature (of at least 20° C.) still enables, though not requires, the preceding cooling of the encased sausages, for instance to loosen the casing form the sausage (thermo shock).

Further advantages can be realized when the temperature of the sausage is monitored throughout the process with at least one controller, while the process steering may subsequently automatically be arranged based on the measured values(s). Especially the critical control points such as the high temperature for lethality and a lower chill temperature are monitored and controlled (automatically adjusted) by a controller.

What is claimed:

1. Method for producing preformed peeled packed sausages, comprising the steps of subsequently:
   A) heating an encased sausage to a surface temperature of 50° C.;
   B) peeling a casing from the sausage at a sausage surface temperature of at least 20° C.; and
   C) packing the peeled sausage;
   D) fully cooking the peeled sausage in the package with intermittent cooking;
   wherein heating of the encased sausage during step A) results in partial hardening of the sausage dough due to at least partial coagulation of the proteins thereby providing enhanced rigidity without fully cooking the sausage;

E) cooling the fully cooked packaged sausage in cold water to 5° C. or less.

2. Method according to claim 1, characterised in that the encased sausage is heated during step A) to such an extend that it is not fully coagulated.

3. Method according claim 1, characterised in that the casing peeled from the sausage is comprising a cellulose, an alginate and/or a collagen.

4. Method according to claim 1, characterised in that the casing is peeled from the sausage during step B) at a sausage surface temperature of at least 30° C.

5. Method according to claim 1, characterised in that the casing is peeled from the sausage during step B) at a sausage surface temperature of at least 40° C.

6. Method according to claim 1, characterised in that the peeled packed sausage is heated in the packaging to a surface temperature of at least 72° C.

7. Method according to claim 1, characterised in that the peeled packed sausage is heated in the packaging to a core temperature of at least 72° C.

8. Method according to claim 1, characterised in that the peeled sausages are smoked before they are packed.

9. Method according to claim 1, characterised in that the temperature of the sausage is monitored in the process with at least one controller.

10. The method of claim 8 wherein the peeled sausages are smoked using multiple cooking zones.

11. The method of claim 10 wherein at least one cooking zone has a 60° C. dry bulb and a 38° C. wet bulb.

12. The method of claim 10 wherein at least one cooking zone has a 70° C. dry bulb and a 55° C. wet bulb.

13. The method of claim 11 wherein at least one cooking zone has a 70° C. dry bulb and a 55° C. wet bulb.

14. The method of claim 9 wherein a steering process is automatically arranged based upon the monitored temperature.

15. Method for producing preformed peeled packed sausages, comprising the steps of subsequently:
 A) heating an encased sausage to a surface temperature of 50° C.;
 B) peeling a casing from the sausage at a surface temperature of below 4° C.;
 C) packing the peeled sausage;
 D) fully cooking the peeled sausage in the package with intermittent cooking;
 wherein heating of the encased sausage during step A) results in partial hardening of the sausage dough due to at least partial coagulation of the proteins thereby providing enhanced rigidity without fully cooking the sausage;
 E) cooling the fully cooked packaged sausage in cold water to 5° C. or less.

* * * * *